C. V. BATES.
BOW CLAMP FOR AUTOMOBILE TOPS.
APPLICATION FILED SEPT. 8, 1916.
1,244,281.  Patented Oct. 23, 1917.
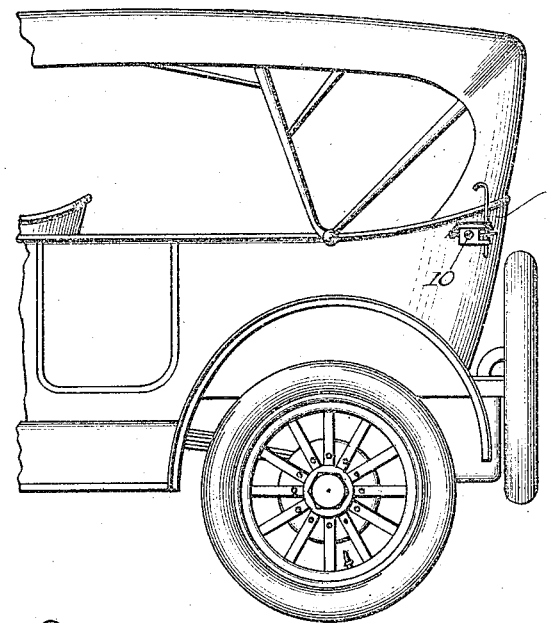
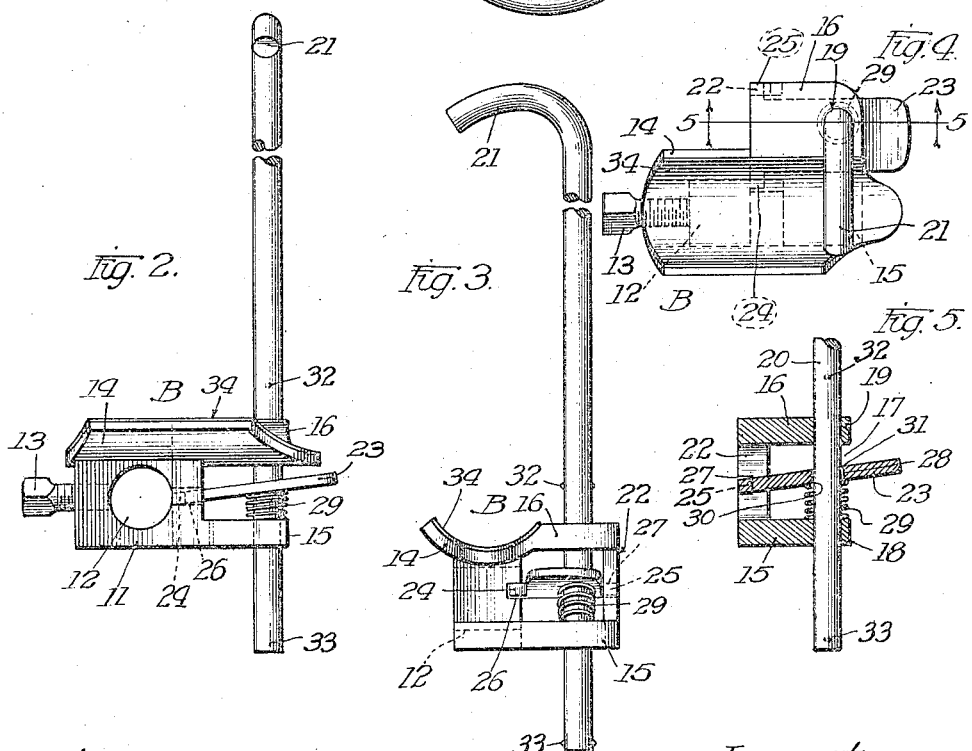
Witnesses:
Robert H. Weir
Arthur W. Carlson
Inventor
Clifford V. Bates
James R. Offield
Atty.

UNITED STATES PATENT OFFICE.

CLIFFORD V. BATES, OF CHICAGO, ILLINOIS.

BOW-CLAMP FOR AUTOMOBILE-TOPS.

1,244,281.

Specification of Letters Patent.

Patented Oct. 23, 1917.

Application filed September 8, 1916. Serial No. 118,983.

*To all whom it may concern:*

Be it known that I, CLIFFORD V. BATES, a citizen of the United States, and a resident of Chicago, in the county of Cook and State of Illinois, have invented certain new and useful Improvements in Bow-Clamps for Automobile-Tops, of which the following is a specification.

My invention relates to clamps for automobile tops, its object being to produce a clamp which can be more readily adjusted to receive and to clamp the bows and which will accurately hold its adjusted position.

In letting down the top of an automobile the bows are folded together and applied in vertical alinement on a support provided therefor. Straps have been used for clamping the bows together while in this position but straps are inclined to stretch and tear after a period of use. Metal clamps have therefore been introduced involving a fitting to be secured to the bow receiving bracket and having a hooked rod for hooking over the bows, the rod being threaded and a nut being provided for drawing down or releasing the rod. This form of clamp has its disadvantages. Before a rod can be withdrawn to receive the bows or drawn down to clamp the bows the nut must be turned and this is a very tedious and disagreeable operation, particularly after the threads have become rusted. Furthermore, the nut will loosen and rattle during running of the machine.

The object of my invention is to produce a bow receiving and clamping attachment in which a simple clamping plate is provided for automatically locking the clamping hook rod in any adjusted position, the plate being so arranged that a slight pressure thereon will release the rod.

On the accompanying drawings the device of my invention is shown. On the drawings Figure 1 is a side elevational view of the rear end of an automobile showing my improved attachment thereon.

Fig. 2 is a side elevational view,

Fig. 3 is a rear elevational view,

Fig. 4 is a plan view, and

Fig. 5 is a sectional view on plane 5—5, Fig. 4.

Referring to Fig. 1 a stud arm or bracket 10 is usually provided on the body of an automobile for supporting the bow tops when they are folded together, and on this support my improved attachment A is secured. In Figs. 2 to 5 the details of construction are shown. A fitting B preferably in the form of a casting comprises the body part 11 through which is the hole 12 for receiving the arm or bracket 10, a set screw 13 serving to secure the fitting to the support. On the block is a shelf 14 of concave transverse section, this shelf extending horizontally to form a seat for the bows. Extending laterally from the block and the shelf are the lugs 15 and 16 between which is the space 17. Through these lugs are the holes 18 and 19 for the vertical cylindrical clamping rod 20 which at its upper end is curved to form a hook 21 for engaging over the top bow when the bows are folded on the shelf 14. At their rear inner corners the lugs are connected by the vertical brace or wall section 22. A clamping plate 23 has at its inner corners the lateral pivot extensions 24 and 25 for engaging in the pivot notches 26 and 27 respectively in the body 11 and brace wall 22. The plate extends laterally substantially midway between the lugs and has the hole 28 therethrough in register with the holes 18 and 19 in the lugs, the rod 20 extending through these holes. The rod shifts readily through the holes 18 and 19 and the diameter of the hole 28 is such that when the plate 23 is at right angles with the rod the rod will slide easily therethrough. Encircling the rod between the lower lug 15 and the clamping plate is the compression spring 29 which tends to force the plate upwardly to be at an angle with the rod and to force the edge 30 into biting engagement with the rod to lock the rod against upward movement. The plate extends outwardly from the lugs a sufficient distance to form finger surface so that the plate can be swung downwardly against the force of spring 29. Upon such downward swing the edge 30 will be released from the rod and the rod can be then readily shifted.

Before the bows are folded together the clamping plate is depressed and the rod pulled upwardly and turned sufficiently to swing the hook end 21 out of the plane of the bows whereupon the bows are folded together to be in vertical alinement on the supporting shelf 14. The rod 20 is then turned to bring the hook end 21 over the top bow, is then forced downwardly to securely clamp the bows together and against the shelf 14. When the clamping plate 23 is swung upwardly by the spring 29 the upper edge 31 will tend to bite the rod, but upon downward pressure on the rod the spring will yield so that the rod can be readily shifted through the plate. However, when the rod is released after the bows have been securely pressed down against the shelf the spring again becomes effective to force the edge 30 against the rod and upward movement of the rod will be prevented and the bows will remain securely clamped together and to the shelf, and the rod can not rattle loose during running of the machine. When it is desired to release the bows to put up the top a slight pressure on the plate 23 will effect release and the rod can then be shifted upwardly and turned to allow withdrawal of the bows. To limit the shifting of the rod in the fitting B and to prevent accidental escape thereof, upper and lower stop projections or burs 32 and 33 may be provided on the rod to engage with the upper and lower lugs respectively. The shelf seat may be lined with leather 34 to protect the bows, and if desired the inner face of the hook may be so lined.

My invention is a decided improvement over such clamp attachments which require tedious and disagreeable turning of nuts, for all that is required to clamp the bows to my improved attachment is to push the rod down, and to effect release all that is required is a slight pressure on the clamping plate.

I do not, of course, desire to be limited to the precise construction and arrangement shown, as modifications may be possible which would still come within the scope of the invention.

I claim as follows:

1. A bow supporting and clamping attachment for automobiles comprising a fitting and adapted to be secured to the automobile body, a shelf on said fitting for receiving the folded bows, a lug extending outwardly from said fitting and having a vertical hole therethrough, a rod shiftable freely through said hole and having a hooked upper end for engaging the upper bow, a clamping plate pivoted at its inner end to the fitting and extending outwardly therefrom and having a hole at its outer end for receiving the rod, said plate hole being of a diameter to permit free shifting of the rod therethrough in either direction when the plate is at right angles with the rod, and a spring tending to swing the plate to be at an angle with the rod and to force the lower edge of the plate hole into biting engagement with the rod to prevent upward shift of the rod, the outer end of said plate providing finger surface whereby it may be swung downwardly against the force of the spring to release the rod.

2. A bow supporting and clamping attachment for automobiles comprising a fitting adapted to be secured to the automobile body, a shelf on said fitting for receiving the folded bows, upper and lower lugs extending laterally on said fitting and having vertically alined holes therethrough, a rod shiftable freely through said holes and having a hooked upper end for engaging the upper bow, a clamping plate pivoted at its inner end to the fitting and extending laterally between the lugs and having a hole for receiving the rod, said plate hole being of a diameter to permit free shifting of the rod therethrough in either direction when the plate is at right angles with the rod, and a compression spring encircling the rod between the lower lugs and the plate and tending to swing the plate upwardly to be at an angle with the rod and to force the lower edge of the plate hole into biting engagement with the rod to prevent upward shift of the rod, said plate extending beyond said lugs to form finger surface whereby it may be swung downwardly against the spring to release the rod.

3. A bow supporting and clamping attachment for the bows of an automobile comprising a fitting adapted to be secured to the vehicle body in the path of the bows when folded, a shelf for said fitting for receiving the folded bows, vertically spaced upper and lower lugs extending laterally and inwardly on the fitting, vertically alined holes through said lugs, a rod slidable vertically in said holes and having its upper end hooked to overhang the shelf and to engage with the top bow, a clamping plate extending laterally between the lugs, pivot projections at the inner corners of said plate and said fitting having pivot slots for receiving said pivot projections whereby said plate may swing vertically, said plate having a cylindrical opening therethrough for receiving the rod, said opening being of a diameter to permit free shift of the rod through the plate when the plate is at right angles with the rod, and a spring tending to swing the clamping plate upwardly to cause clamping engagement between the lower edge of the plate opening and the rod to thereby prevent upward shift of the rod.

In witness whereof I hereunto subscribe my name this 2nd day of September, A. D., 1916.

CLIFFORD V. BATES.